(12) United States Patent
Kim et al.

(10) Patent No.: US 9,110,973 B2
(45) Date of Patent: Aug. 18, 2015

(54) METHOD AND APPARATUS FOR PROCESSING A QUERY

(75) Inventors: Younghoon Kim, Seoul (KR); Hyoungmin Park, Seoul (KR); Kyuseok Shim, Seoul (KR); Kyoung-gu Woo, Seoul (KR)

(73) Assignees: Samsung Electronics Co., Ltd., Suwon-si (KR); SNU R&DB Foundation, Seoul (KR)

(*) Notice: Subject to any disclaimer, the term of this patent is extended or adjusted under 35 U.S.C. 154(b) by 665 days.

(21) Appl. No.: 13/273,569

(22) Filed: Oct. 14, 2011

(65) Prior Publication Data

US 2012/0259862 A1    Oct. 11, 2012

(30) Foreign Application Priority Data

Apr. 8, 2011    (KR) .................. 10-2011-0032898

(51) Int. Cl.
*G06F 7/00*    (2006.01)
*G06F 17/30*    (2006.01)

(52) U.S. Cl.
CPC .............. *G06F 17/30634* (2013.01)

(58) Field of Classification Search
CPC .................................. G06F 17/30634
USPC ........................................ 707/719
See application file for complete search history.

(56) References Cited

U.S. PATENT DOCUMENTS

| 2010/0125594 A1* | 5/2010 | Li et al. ............ 707/758 |
| 2010/0241622 A1* | 9/2010 | Jin et al. ........... 707/719 |

FOREIGN PATENT DOCUMENTS

| JP | 2007-286742 | 11/2007 |
| JP | 2008-026963 | 2/2008 |
| JP | 2009-104669 | 5/2009 |
| KR | 10-1999-0084950 | 12/1999 |
| KR | 10-2007-0024105 | 3/2007 |

* cited by examiner

*Primary Examiner* — Jacob F Bétit
*Assistant Examiner* — Christy Kim
(74) *Attorney, Agent, or Firm* — NSIP Law

(57) ABSTRACT

Provided are a method and apparatus for processing a query. The method includes generating string sets comprising a plurality of partial strings from a query string, determining a subset of the string sets as a candidate set, and searching for a document comprising the query string from the candidate set.

14 Claims, 8 Drawing Sheets

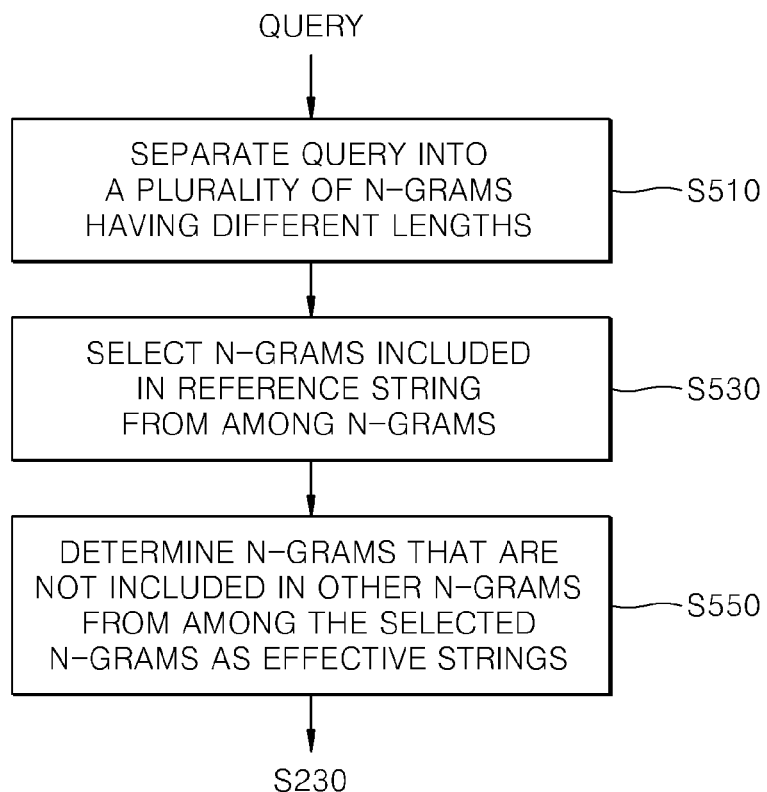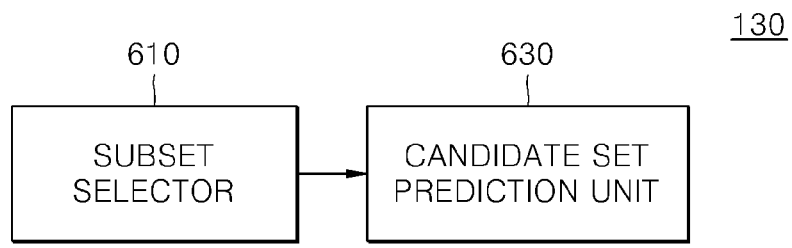

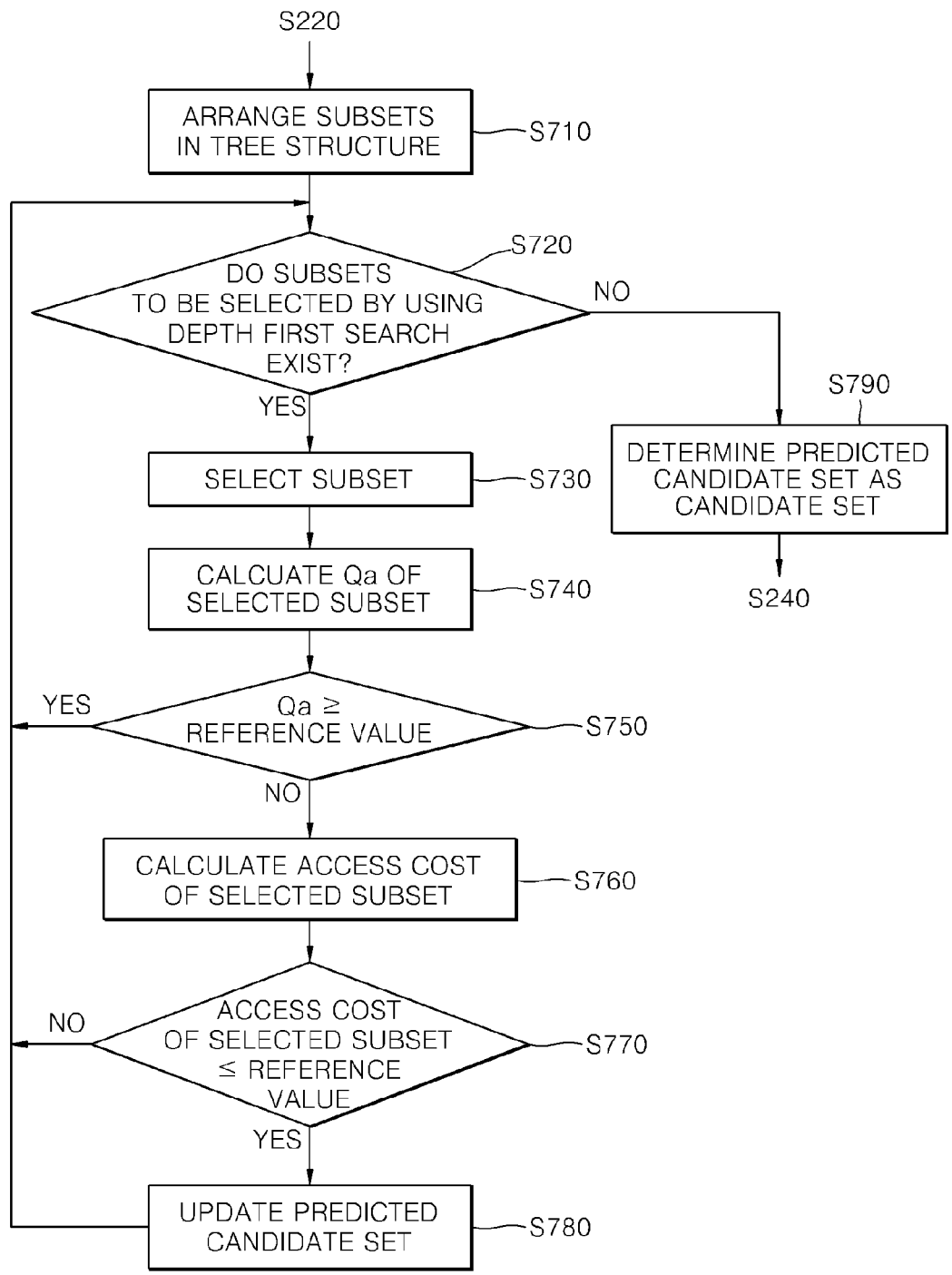

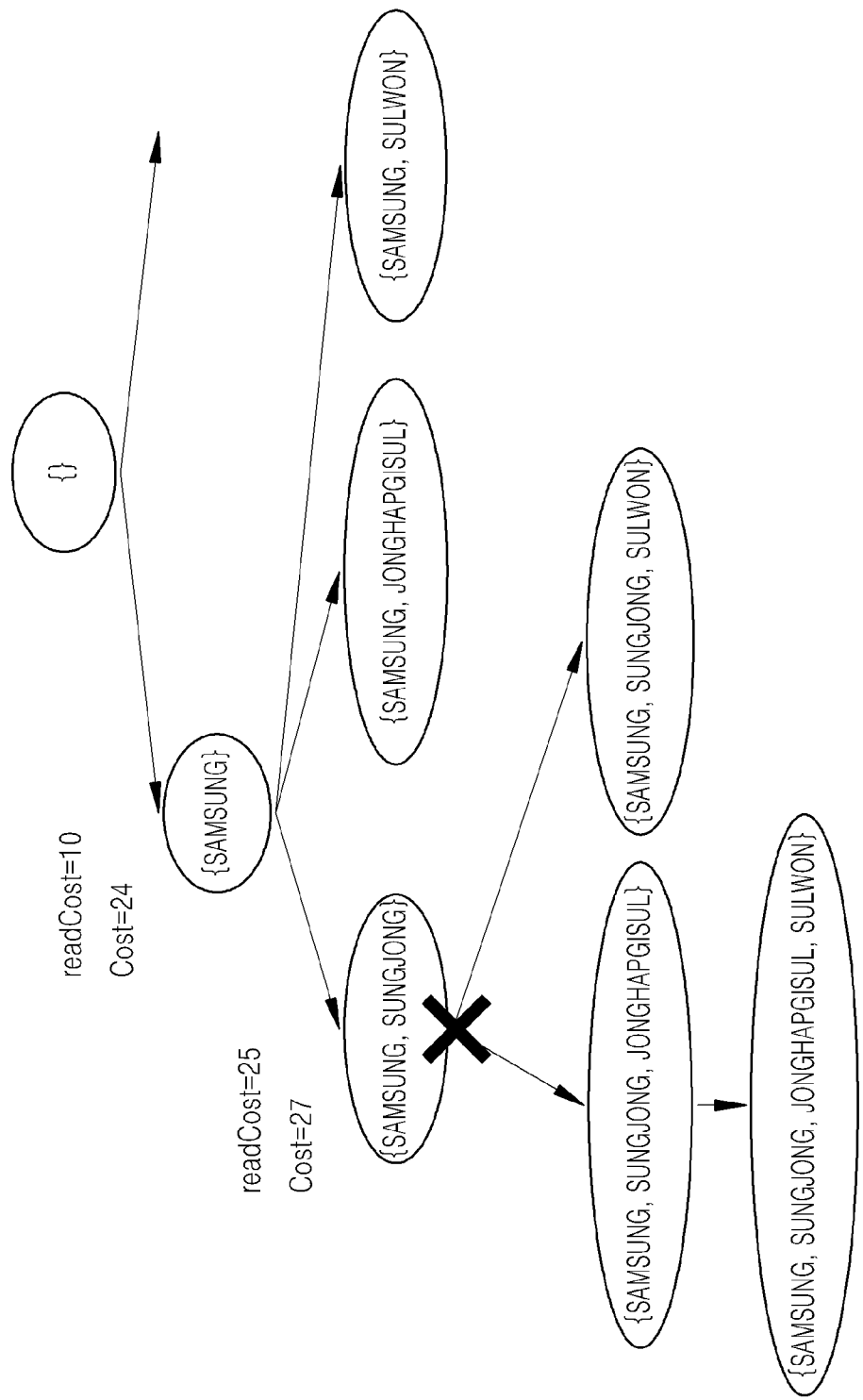

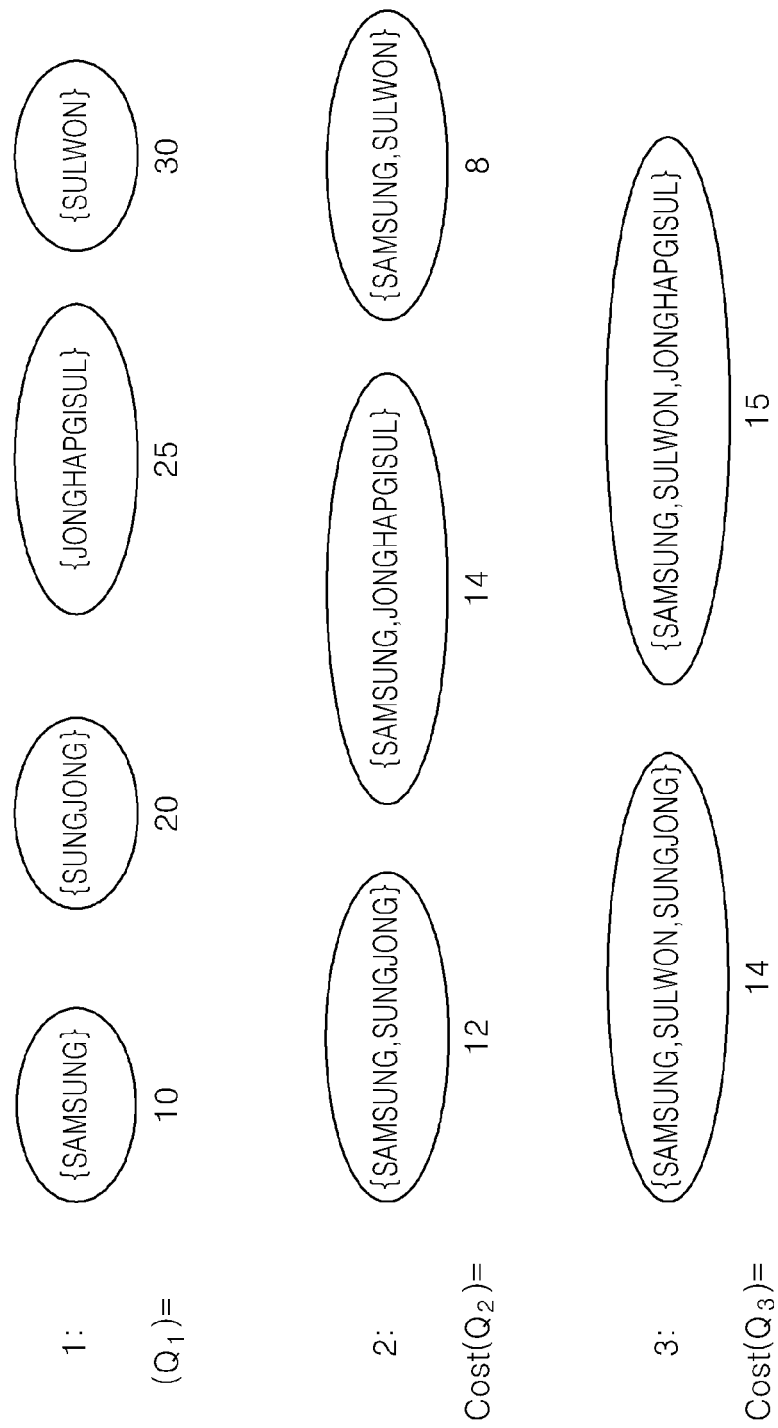

METHOD AND APPARATUS FOR PROCESSING A QUERY

CROSS-REFERENCE TO RELATED APPLICATION(S)

This application claims the benefit under 35 U.S.C. §119(a) of Korean Patent Application No. 10-2011-0032898, filed on Apr. 8, 2011, in the Korean Intellectual Property Office, the entire disclosure of which is incorporated herein by reference for all purposes.

BACKGROUND

1. Field

The following description relates to methods and apparatuses for processing a query string.

2. Description of the Related Art

Searching for text documents is widely used in various fields such as searching for information represented by natural language, genetic sequence processing, and the like. In sequences of protein and DNA, certain alphabet sequences such as A, C, G, and T of DNA are regarded as text documents. A representative probability model for searching for text documents may include an n-gram model or a q-gram model.

SUMMARY

In one general aspect, there is provided a method of processing a query, the method including generating, from a query string, an effective string set comprising a plurality of partial strings, generating a plurality of subsets of the effective string set, each respective subset comprising one or more of the partial strings, determining a subset from the plurality of subsets as a candidate set based on access costs of the plurality of subsets for a database in which information about a plurality of documents is stored, and searching for a document comprising the query string from the information stored in the database using the candidate set.

The candidate set may be a subset that has an access cost that is less than a reference value.

The reference value may be a minimum value of a previously calculated access cost.

The access cost may comprise at least one of a sum of cost used to access and read a posting list of each partial string included in the subset in the database, and a cost used to access and read document identification information commonly included in the posting lists of the partial strings included in the subset in the database.

The lengths of at least two partial strings of the effective string set may be different from each other.

The partial strings of the effective string set may be those partial strings that are not included in other partial strings of the plurality of partial strings.

The generating of the effective string set may comprise separating the query string into n-grams having a variety of lengths, selecting n-grams included in index terms of the database from among the n-grams, and determining a set of n-grams that are not included in other n-grams, from among the selected n-grams, as the effective string set.

The candidate set may be determined to be a subset that has the minimum access cost from among the subsets of the effective string set.

The candidate set may be determined to be a first subset that has an access cost that is less than an access cost of a second subset in which a partial string is added to the first subset, from among the subsets of the effective string set.

The determining the subset as the candidate set may comprise arranging subsets of the effective string set in a tree structure, selecting subsets in the tree structure using a depth first search, calculating access costs of the selected subset, and determining a subset that has a minimum access cost as a candidate set.

The determining the subset as the candidate set may comprise selecting first subsets that have the same number of partial strings from among subsets of the effective string set, calculating access costs for each of the first subsets, predicting a subset that has a minimum access cost as a candidate set, selecting second subsets, in which a partial string is added to the predicted candidate set from among subsets of the effective string set, and if access costs for each of the second subsets are greater than the access cost of the predicted candidate set, determining the predicted candidate set as the candidate set.

The database may comprise an inverted index database comprising an index tree and posting lists, and a document database in which a plurality of documents having identification information are stored.

The searching for the document may comprise searching for identification information of documents that match all partial strings of the candidate set in the inverted index database, and searching for documents that have the identification information of the documents in the document database.

In another aspect, there is provided a computer-readable storage medium having stored therein program instructions to cause a processor to implement a method including generating, from a query string, an effective string set comprising a plurality of partial strings, generating a plurality of subsets of the effective string set, each respective subset comprising one or more of the partial strings, determining a subset from the plurality of subsets as a candidate set based on access costs of the plurality of subsets for a database in which information about a plurality of documents is stored, and searching for a document comprising the query string from the information stored in the database using the candidate set.

In another aspect, there is provided an apparatus for processing a query, the apparatus including a user interface configured to receive a query string and to output a document comprising the query string, a database in which information about a plurality of documents is stored, and a processor configured to generate, from the received query string, an effective string set comprising a plurality of partial strings, generate a plurality of subsets of the effective string set, each respective subset comprising one or more of the partial strings, determine a subset from the plurality of subsets as a candidate set based on access costs of the plurality of subsets for a database in which information about a plurality of documents is stored, and search for a document comprising the received query string from the information stored in the database using the candidate set.

The access cost may comprise at least one of a sum of cost used to access and read a posting list of each partial string included in the subset in the database and a cost used to access and read document identification information commonly included in the posting lists of the partial strings included in the subset in the database.

The lengths of at least two partial strings from among partial strings of the effective string set may be different from each other.

The partial strings of the effective string set may be those partial strings that are not included in other partial strings of the plurality of partial strings.

The candidate set may be determined to be a subset that has the minimum access cost from among the subsets of the effective string set.

The candidate set may be determined to be a first subset that has an access cost that is less than an access cost of a second subset, in which a partial string is added to the first subset, from among the subsets of the effective string sets.

The database may comprise an inverted index database comprising an index tree and posting lists, and a document database in which a plurality of documents having identification information are stored.

The processor may be configured to search for identification information of documents that match all partial strings of the candidate set in the inverted index database and search for documents that have the identification information of the documents in the document database.

Other features and aspects may be apparent from the following detailed description, the drawings, and the claims.

BRIEF DESCRIPTION OF THE DRAWINGS

FIG. 5 is a flowchart illustrating an example of a method of generating an effective string.

FIG. 6 is a diagram illustrating an example of a candidate set determination unit.

FIG. 7 is a flowchart illustrating an example of a method of determining a candidate set.

FIG. 8 is a diagram illustrating an example of determining a candidate set of FIG. 7.

FIG. 10 is a diagram illustrating an example of determining a candidate set of FIG. 9.

Figure 1:
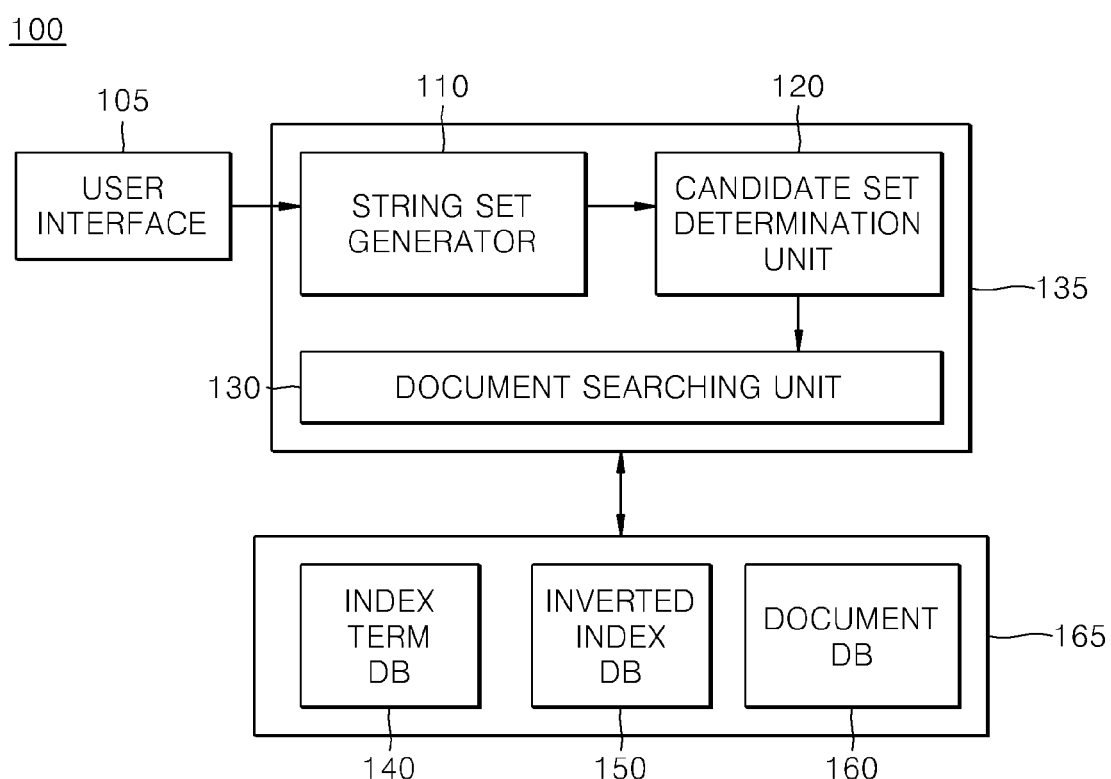
FIG. 1 is a diagram illustrating an example of an apparatus for processing a query.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus for processing a query.

Referring to FIG. 1, apparatus 100 for processing a query includes a user interface 105, a processor 135, and a storage 165. The apparatus 100 may be a terminal such as a personal computer (PC), a mobile phone, a tablet, and the like, or a separate server connected to a user terminal by a network such as Internet which may include a search engine represented by a web page and which outputs search results for query strings. Accordingly, the apparatus 100 may further include other general elements such as communication modules for communicating with another PC, portable terminal, server, and the like.

The user interface 105 may receive a query from a user and may output search results of a document according to the query. For example, the user interface 105 may include an input device for receiving a query from a user, such as a keyboard, mouse, and the like, and an output device for outputting search results of a document to the user. The user interface 105 may be a graphic user interface (GUI) such as a web page. As described in various examples, the query denotes a request of a user to search for a document including a certain string. Hereinafter, the string included in the query is referred to as a "query string."

The storage 165 may store information about a number of documents including arbitrary strings. For example, the storage 165 may include index term database (DB) 140, in which index terms are stored. The index terms are partial strings that may be used to search for documents. The storage 165 may include an inverted index DB 150, in which identification information of the documents matched with the index terms are stored. The inverted index DB 150 may be generated by separating texts included in the document into an n-gram and matching each partial string separated into the n-gram with information about the corresponding document. The storage 165 may include a document DB 160, in which a document corresponding to the identification information of the documents is stored. In this example, the document DB 160 is included in the apparatus 100 for processing a query. However, it should be appreciated that the document DB 160 may be included in an external device or a server which communicates with the apparatus 100 for processing a query.

In response to a query string being received by the processor 135, the processor 135 may separate the query string into an n-gram and read the identification information of the documents matched with the partial string included in the query string. Also, the processor 135 may read the document that has the identification information from the document DB 160. The processor 135 may include a string set generator 110, a candidate set determination unit 120, and a document searching unit 130. Examples of the elements of the processor 135 are described in a method of searching for a document below.

Figure 2:
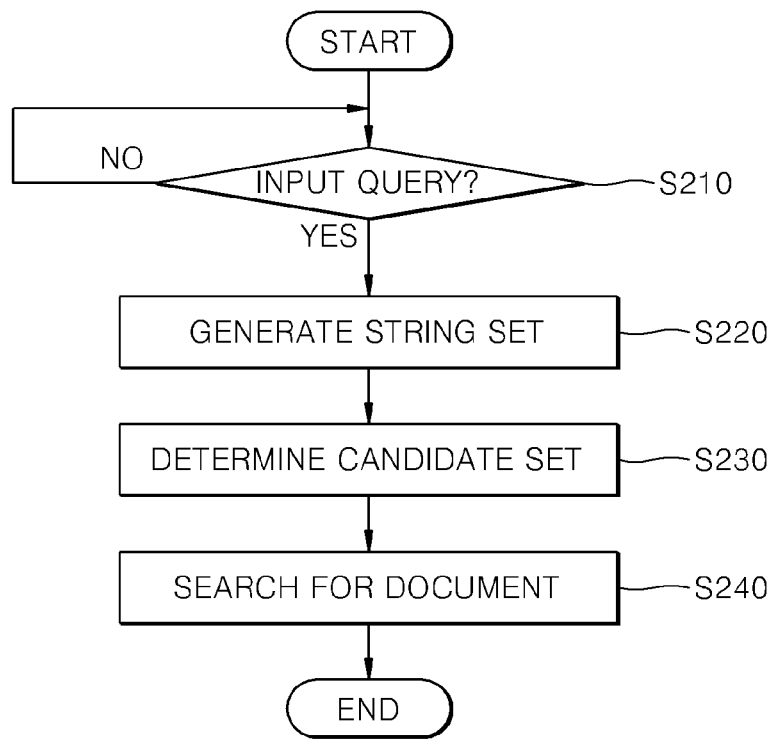
FIG. 2 is a flowchart illustrating an example of a method of searching for a document based on a query string.

FIG. 2 illustrates an example of a method of searching for a document based on a query string. The method may be performed by the processor 135 based on a query string.

Referring to FIG. 2, if a query string is received by an input unit in S210, string set generator 110 generates an effective string set including partial strings, for example, effective strings, which may be used to search for a document in the query string, in S220. The effective strings may be a plurality of partial strings that have different lengths and that are not included in other effective strings.

In S230, the candidate set determination unit 120 determines a set (hereinafter, referred to as 'candidate set') from among subsets of an effective string set. In S240, the document searching unit 130 searches for a document including the query string using the candidate set.

Figure 3:
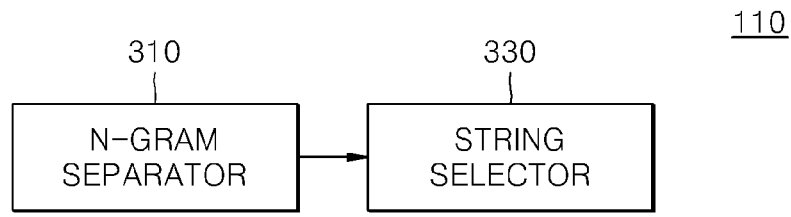
FIG. 3 is a diagram illustrating an example of a string set generator.

FIG. 3 illustrates an example of a string set generator.

Referring to FIG. 3, string set generator 110 includes an n-gram separator 310 and a string selector 330. The n-gram separator 310 may separate the query string into a plurality of n-grams that have different lengths and the string selector 330 may select an n-gram included in index terms that are stored in the index term DB 140 from among the n-grams, as an effective string.

The index term DB 140 is a DB in which information about index terms may be stored, and may store a range of the length of strings that may become index terms. Also, the index term DB 140 may be a tree structure. For example, a unit letter may be disposed in each node and the range of length may be set. Accordingly, letters in the length range, in which a parent node and a child node are sequentially connected to each other, may be index terms. The index terms that are stored in the index term DB 140 may be equal to index terms that are stored in the inverted index database 150. For convenience of description, the index term DB 140 is separately described. However, the string selector 330 may select an n-gram that is included in the index terms of the inverted index database 150 from among the n-grams as an effective string.

Figure 4:
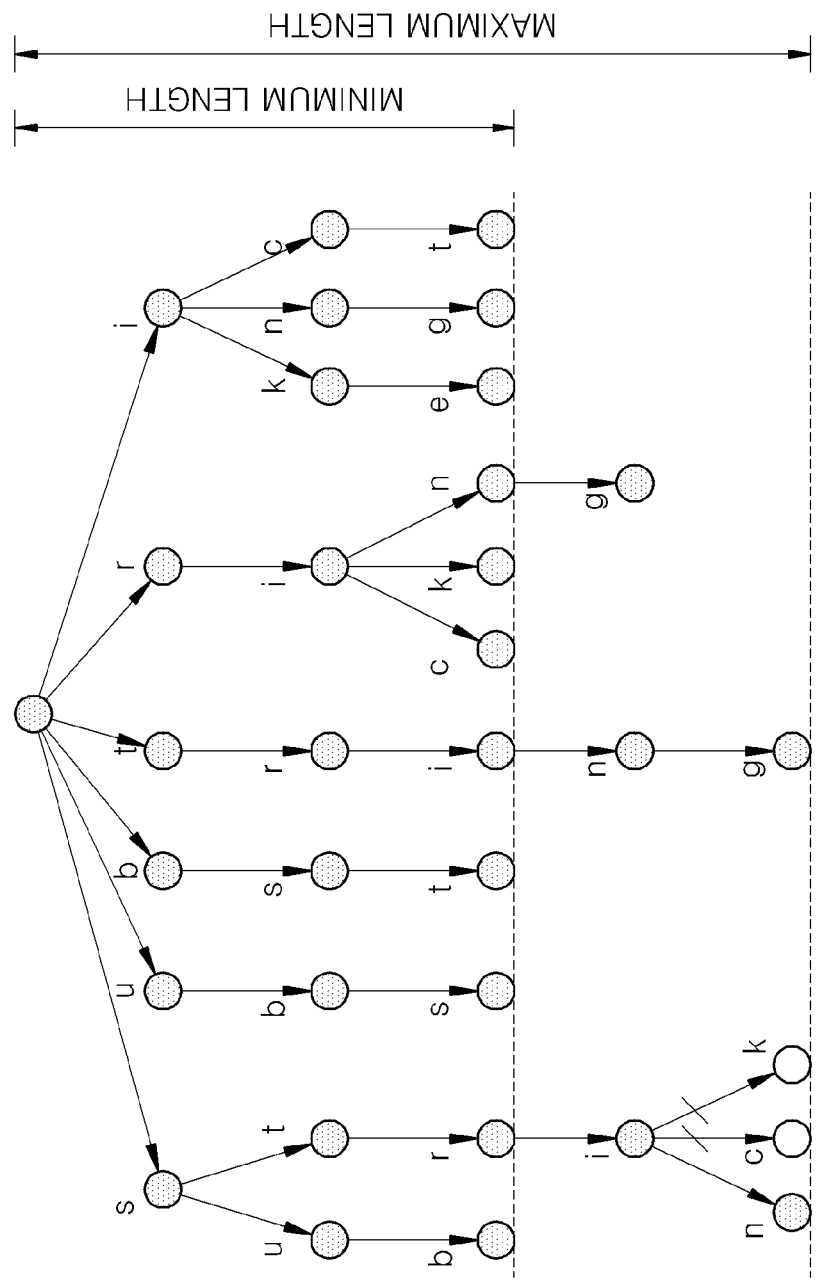
FIG. 4 is a diagram illustrating an example of an index term represented by a tree structure.

FIG. 4 illustrates an example of an index term represented by a tree structure.

Referring to FIG. 4, a unit letter is assigned to each node of the tree structure, and the minimum length and maximum length of an index term are 3 and 5, respectively. In this example, nodes corresponding to 's', 'u,' and 'b' are sequentially connected and 'sub' may be an index term. However, nodes corresponding to 's', 't', 'r', 'i,' and 'c' are not sequentially connected and thus 'stric' may not be an index term.

FIG. 5 illustrates an example of a method of generating an effective string.

As illustrated in FIG. 5, when a query string is input, the n-gram separator 310 separates the query string into a plurality of n-grams that have different lengths, in S510. The length of an n-gram may be included in the previously set length range. For example, if the query string includes m letters and the length range thereof is between i and k (here, 2≤i<k≤m), the n-gram separator 310 may separate the query string into an n-gram that has a length of i, an n-gram that has a length of i+1, ... an n-gram that has a length of k−1, and an n-gram that a length of k.

For example, if the query string 'substring' is input, and the length range stored in the index term DB 140 is between 3 and 5, the n-gram separator 310 may separate the query string into first partial strings having a length greater than or equal to 3 and less than or equal to 5. That is, the first partial strings are 'sub', 'ubs', 'bst', 'str', 'tri', 'rin', 'ing', 'subs', 'ubst', 'bstr', 'stri', 'trin', 'ring', 'subsr', 'ubstr', 'bstri', 'strin', and 'tring.'

In S530, the string selector 330 selects n-grams included in the index terms stored in the index term DB 140 from among the n-grams. That is, sub', 'ubs', 'bst', 'str', 'stri', 'strin', 'tri', 'trin', 'tring', 'rin', 'ring', 'ing' from among the n-grams are included in the index terms, and thus, the string selector 330 may select the n-grams above.

In S550, the string selector 330 determines n-grams that are not included in other n-grams from among the n-grams included in the index terms as effective strings. Accordingly, the string selector 330 may determine 'sub', 'ubs', 'bst', 'strin', 'tring' as effective strings. For example, because 'tri' is included in the n-grams 'tring' and 'strin' which are selected by the string selector 330 in S530, the string selector 330 does not select 'tri' as an effective string in S550.

As described herein, if documents are searched using a plurality of partial strings that have different lengths, query processing speed may be improved in comparison to when documents are searched using partial strings that have the same length. Also, when the partial strings having different lengths are not overlapped with each other, query processing time may be reduced compared with searching by using overlapped partial strings.

FIG. 6 illustrates an example of a candidate set determination unit.

Referring to FIG. 6, the candidate set determination unit 120 includes a subset selector 610 and a candidate set prediction unit 630. The subset selector 610 may select subsets of sets of effective strings (hereinafter, referred to as 'effective string sets') and the candidate set prediction unit 630 may predict any one subset from among the effective strings sets as a candidate set based on an access cost of the subset for the inverted index DB 150.

In various examples, the inverted index DB 150 includes an index tree and a posting list. The index tree may have a B+ tree structure in which index terms as partial strings exist in leaf nodes. The posting list is a list of identification information of documents that may include specific index terms and location information of index terms in the documents. In this example, the document identification information and the location information, which are elements of the posting list, are referred to as posting.

Firstly, calculation of the access cost of the candidate set prediction unit 630 is described. The candidate set prediction unit 630 may calculate the access cost using Equation 1 below.

$$\text{Cost}(Q) = Q_a + Q_b = \sum_{(g_i,p_i)\in Q} (h + l_i - 1) + f_B\left(\left|\prod_{rid}\left(\bigcap_{(g_i,p_i)\in Q} \hat{L}_i\right)\right|\right) \quad \text{[Equation 1]}$$

In Equation 1, Q denotes a specific subset of effective string sets, $g_i$ denotes an $i^{th}$ partial string included in Q, $P_i$ denotes location information of $g_i$ in an index tree, h−1 is the height of an index tree, $I_i$ denotes the number of leaf nodes in an index structure including a posting list for $g_i$, and $L_i$ denotes a posting list of $g_i$.

Also, a function Fb applied to Equation 1 is represented by Equation 2 below.

$$f_B(n) = \begin{cases} |R| \cdot [1 - (1 - 1/|R|)^n], & \text{if } n < k_0 \\ B + (n - k_0)(1 - B/|R|), & \text{if } n \geq k_0 \end{cases}, \quad \text{[Equation 2]}$$

In Equation 2, |R| is the number of documents in a document DB and B is a size of a buffer that is used to read an inverted index DB. Also, $k_0 = \ln(1-B/|R|)/\ln(1-1/|R|)$.

The access cost may be divided into the sum (hereinafter, referred to as Qa) of cost (or an amount of data) used to access and read the posting list of effective strings in the inverted index DB for each effective string included in the subset and a cost (hereinafter, referred to as Qb) that is used to access and read a document corresponding to identification information of a document that is commonly included in the posting list of effective strings included in the subset in a document DB.

In this example, Qa in the access cost is a fixed cost regardless of effective strings and always increases, and Qb in the access cost may increase or decrease according to the type of subset.

The candidate set determination unit 120 may determine candidate sets in various ways. For example, the candidate set determination unit 120 may determine a subset that has the minimum access cost from among the subsets of effective strings as a candidate set.

FIG. 7 illustrates an example of a method of determining a candidate set.

Referring to FIG. 7, in S710, the subset selector 610 arranges subsets of the effective string sets in a tree structure.

In the tree structure, for example, subsets corresponding to child nodes may include subsets of parent nodes.

In S720, the subset selector 610 determines whether there are subsets to be selected using a depth first search in the subsets that are arranged in the tree structure. In the depth first search, nodes may be searched sequentially from a root node to low nodes that are disposed farthest from the root node. When there are nodes which do not have child nodes, other nodes may be searched by backtracking.

If there are subsets to be selected using the depth first search, the subset selector 610 selects the subset, in S730. The subset selector 610 may determine whether there are subsets to be selected by firstly selecting the subset that has one effective string and selecting other subsets including the effective string. In S740, the candidate set prediction unit 630 calculates Qa in the access cost of the selected subset. An example of calculating the access cost is previously described herein. Also, in S750, the subset selector 610 compares the Qa with a reference value.

If the Qa is above the reference value, the candidate set prediction unit 630 does not calculate an access cost of the selected subset and also does not calculate the access cost of subsets included in lower nodes of a node corresponding to the selected subset. The candidate set prediction unit 630 may again perform operations S720 through S750. In this example, the reference value denotes a minimum value in the access cost of a subset that is previously selected and calculated. Accordingly, if the previously selected subset does not exist, an access cost of a currently selected subset may become a reference value, and the currently selected subset may become a predicted candidate set. That is, when the subset is firstly selected using the depth first search, the candidate set prediction unit 630 does not perform operations S740 through S770, the access cost of the first selected subset becomes a reference value, and the first selected subset becomes a predicted candidate set.

Qa in the access cost may always increases. Thus, when Qa of the currently selected subset is greater than the access cost of the predicted candidate set, the access cost of the currently selected subset is greater than the access cost of the predicted candidate set. Also, the access cost of all subsets, including the currently selected subset, is greater than the access cost of the predicted candidate set. Consequently, the access cost of not only the currently selected subset but also the subsets including the currently selected subset may not be calculated. Accordingly, the search for the subsets including the currently selected subset may be exited and the subset selector 610 may determine whether there are subsets including other strings by backtracking.

In S760, if Qa is less than the access cost of the predicted candidate set, the candidate set prediction unit 630 calculates the access cost of the selected subset and compares the access cost between the selected subset and the predicted candidate set.

If the access cost of the selected subset is less than the access cost of the predicted candidate set, the candidate set prediction unit 630 updates the predicted candidate set to the selected subset, in S780.

As described herein, the candidate set determination unit 120 predicts a candidate set based on the access cost by selecting the subset using the depth first search. Otherwise, if nodes to be selected using the depth first search do not exist, the candidate set determination unit 120 determines a predicted candidate set, that is, a subset having a minimum access cost, as a candidate set, in S790.

FIG. 8 illustrates an example of determining a candidate set of FIG. 7. If the query string 'samsungjonghapgisulwon' is input, the string set generator 110 may generate effective strings 'samsung,' 'sungjong,' 'jonghapgisul,' and 'sulwon' based on the index term DB 140. Also, the string set generator 110 applies the effective string sets to the candidate set determination unit 120.

As illustrated in FIG. 8, the subset selector 610 may arrange subsets of the effective string sets in the tree structure. The subsets of the effective string sets are disposed in each node of the tree structure.

The candidate set prediction unit 630 may calculate access costs for each node sequentially from upper nodes to lower nodes. Calculation of the access cost is previously described herein.

In FIG. 8, readCost(Q') denotes Qa in the access cost for the subset (Q') and Cost(Q') denotes the access cost for the subset (Q'). The candidate set prediction unit 630 may calculate the access cost sequentially from {samsung}, {samsung, sungjong}, {samsung, sungjong, jonghapgisul}, {samsung, sungjong, jonghapgisul, sulwon}, {samsung, sungjong, sulwon}, {samsung, jonghapgisul}, . . . , in this order.

If Qa in the access cost of {samsung, sungjong} is 25 and an access cost of a predicted candidate set, that is, a minimum access cost is 24, additional subsets of arbitrary effective strings in {samsung, sungjong} may have an access cost that is greater than the minimum access cost. Accordingly, the candidate set determination unit 120 does not calculate an access cost for a node corresponding to {samsung, sungjong} and lower nodes.

The candidate set determination unit 120 may determine a subset that has an access cost that is less than an access cost, when one effective string is added, from among the subsets of the effective string sets as a candidate set.

Figure 9:
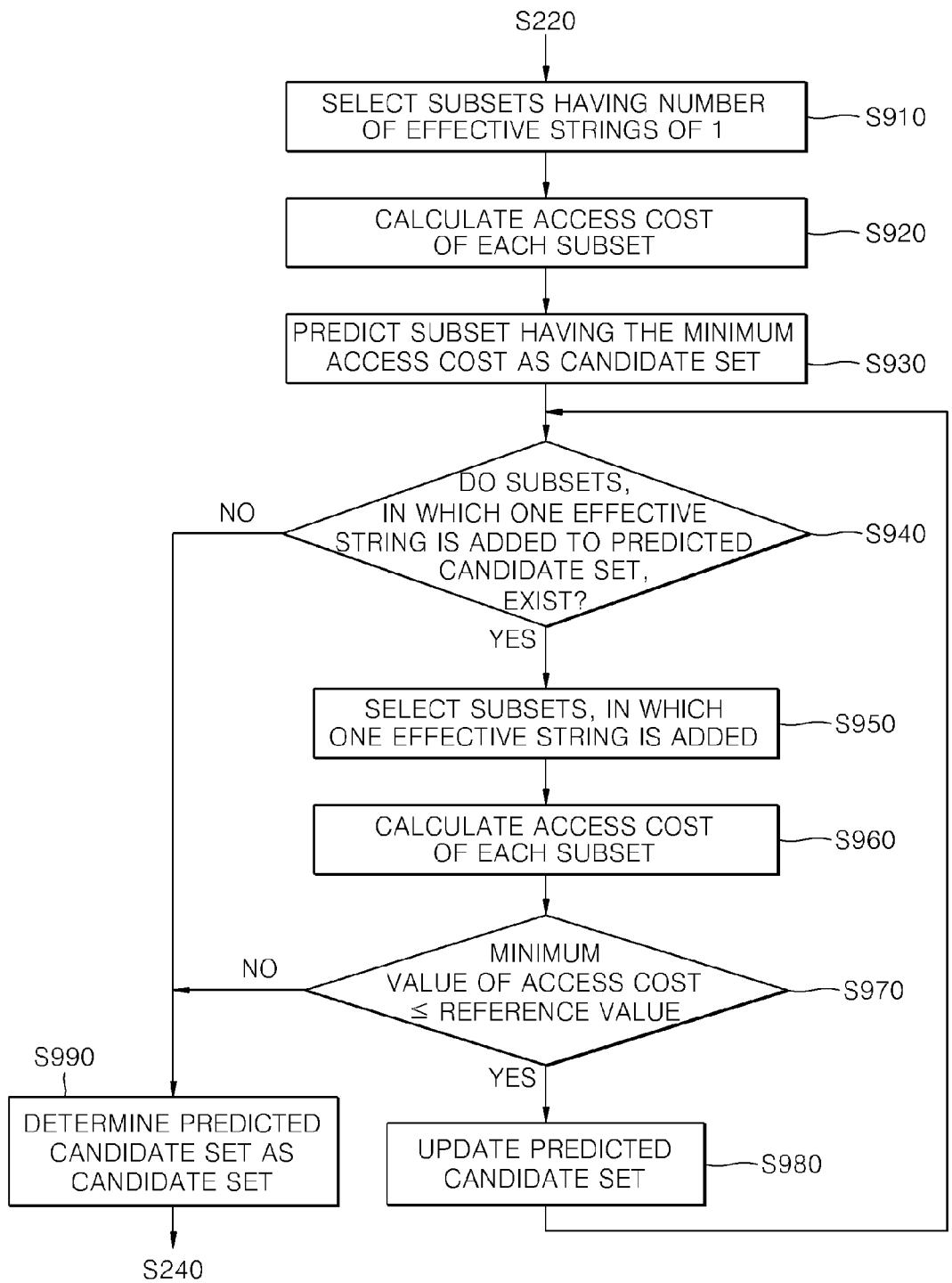
FIG. 9 is a flowchart illustrating another example of a method of determining a candidate set.

FIG. 9 illustrates an example of a method of determining a candidate set.

Referring to FIG. 9, in S910, the subset selector 610 selects subsets that have the number of effective strings of 1 from among the subsets and applies the selected subsets to the candidate set prediction unit 630.

In S920, the candidate set prediction unit 630 calculates access costs for each selected subset, and in S930, predicts the subset that has the minimum access cost as a candidate set. In this example, the minimum access cost becomes a reference value.

In S940, the subset selector 610 determines whether there are subsets in which one effective string is added to a candidate set predicted from among the subsets, exist. If the subset exists, the subset selector 610 selects the subsets, in which one effective string is added to the predicted candidate set, and applies the selected subsets to the candidate set prediction unit 630, in S950.

In S960, the candidate set prediction unit 630 calculates the access cost for each selected subset and compares the minimum value of the calculated access cost with a reference value.

If the minimum value of the access cost is less than the reference value, the candidate set prediction unit 630 updates the predicted candidate set to the subset that has the minimum access cost, in S980. Then, operations S940 through S970 are repeatedly performed.

Otherwise, if the minimum value of the access cost is above the reference value, or the subsets in which one effective string is added to the predicted candidate set do not exist, the candidate set prediction unit 630 determines the predicted candidate set as a candidate set, in S990.

In the example of FIG. 9, the subsets that have one effective string are firstly selected to determine a subset having the minimum query process cost as a candidate set. However, the examples herein are not limited thereto. For example, if the number of effective strings is great, a firstly predicted candidate set may be selected from subsets that have at least two effective strings and thus the subset having the minimum query process cost may be determined as a candidate set.

FIG. 10 illustrates an example of determining a candidate set of FIG. 9.

If the effective string set for the query string 'samsungjonghapgisulwon' is given as {samsung, sungjong, jonghapgisul, sulwon}, in this example the subset selector 610 firstly selects the subsets that has one effective string, that is, {samsung}, {sungjong}, {jonghapgisul}, and {sulwon} and applies the subsets to the candidate set prediction unit 630. Then, the candidate set prediction unit 630 calculates access costs for each subset. If the access costs for the subsets are 10, 20, 25, and 30, respectively, the candidate set prediction unit 630 predicts {samsung} as a candidate set. Then, the subset selector 610 selects subsets, in which one effective string is added to {samsung}, which is a predicted candidate set, that is, {samsung, sungjong}, {samsung, jonghapgisul}, and {samsung, sulwon}, and applies the subsets to the candidate set prediction unit 630. The candidate set prediction unit 630 calculates the access cost for each selected subset. If the access costs for the subsets are 12, 14, and 8, respectively, the access cost of the subset {samsung, sulwon} is less than the access cost of the predicted candidate set, and the candidate set prediction unit 630 updates the predicted candidate set to {samsung, sulwon}.

The subset selector 610 again selects subsets, in which another effective string is added to the subset {samsung, sulwon}, that is, {samsung, sulwon, sungjong} and {samsung, sulwon, jonghapgisul} and applies the selected subsets to the candidate set prediction unit 630. The candidate set prediction unit 630 calculates the access cost for each selected subset. If the access costs for {samsung, sulwon, sungjong} and {samsung, sulwon, jonghapgisul} are 14 and 15, respectively, the access costs are greater than the access cost of the predicted candidate set, and thus, the candidate set prediction unit 630 finally determines {samsung, sulwon} as a candidate set and completes determination of the candidate set.

If the candidate set determination unit 120 determines the candidate set using the method of determining a candidate set of FIGS. 9 and 10, instead of the method illustrated in FIGS. 7 and 8, the time used to determine the candidate set may be reduced. In some examples, the accuracy of the method illustrated in FIGS. 9 and 10 may be lower than that of the method illustrated in FIGS. 7 and 8. Accordingly, the candidate set determination unit 120 may selectively use the methods illustrated in FIGS. 7 and 8 and FIGS. 9 and 10.

For example, if the number of effective strings is less than a reference number, the candidate set determination unit 120 may determine a candidate set according to the method of FIGS. 7 and 8. As another example, if the number of effective strings is above the reference number, the candidate set determination unit 120 may determine a candidate set according to the method of FIGS. 9 and 10.

Finally, identification information of a document matched with all effective strings of the candidate set is determined in the inverted index DB 150 and then the document searching unit 130 searches for the document matched with the identification information of the document in the document DB 160, thereby searching for a document including query.

A processor may be separated into separate elements according to their functions, for convenience of description. However, the processor may be at least one chip.

In the method and apparatus for processing a query, a plurality of partial strings that have lengths that are not fixed are used, and thus, search performance may be improved.

In addition, a general structure of an inverted index DB is not changed and instead, a method of selecting partial strings included in a candidate set or a candidate set may be improved so that a general inverted index DB may be used.

Provided are methods and apparatuses for processing a query which may improve search performance by using a plurality of partial strings that have different lengths. The methods and apparatuses for processing a query may improve query process performance by efficiently determining a subset of a plurality of partial string sets.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processing a query, the method comprising:
generating, from a query string, an effective string set comprising a plurality of partial strings which have a variety of lengths;
generating a plurality of subsets of the effective string set, each respective subset comprising one or more of the partial strings;
determining a reference number of partial strings;
determining, based on access costs of the plurality of subsets for a database in which information about a plurality of documents is stored, a candidate set comprising a subset from the plurality of subsets that has an access cost that is less than a reference value; and
searching for a document comprising the query string from the information stored in the database using the candidate set,
wherein when a number of the partial strings in the effective string set is less than the reference number of partial strings, determining the candidate set comprises
arranging the plurality of subsets in a tree structure,
selecting a subset from among the plurality of subsets using a depth first search in the tree structure,
calculating, for each of the partial strings in the selected subset, a portion of the access cost that comprises a cost used to access and read a posting list of the partial strings,
when the portion of the access cost is less than the reference value, calculating the access cost of the selected subset,
when the access cost of the selected subset is less than or equal to the reference value, predicting the selected subset as a predicted candidate set, and
when there are no additional subsets among the plurality of subsets to be selected using the depth first search, determining the candidate set to comprise the predicted candidate set, and
wherein when the number of the partial strings in the effective string set is greater than the reference number of partial strings, determining the candidate set comprises
selecting first subsets that have a same number of partial strings from among the plurality of subsets,
calculating the access costs for each of the first subsets,
predicting a subset among the first subsets that has a minimum access cost as the predicted candidate set,
selecting second subsets, in which a partial string is added to the predicted candidate set, from among the plurality of subsets, and
when the access costs for each of the second subsets are greater than the access cost of the predicted candidate set, determining the candidate set to comprise the predicted candidate set.

2. The method of claim 1, wherein the reference value is a minimum value of a previously calculated access cost.

3. The method of claim 1, wherein the access cost of the selected subset comprises the portion of the access cost and a cost used to access and read document identification information commonly included in the posting lists of the partial strings included in the selected subset in the database.

4. The method of claim 1, wherein lengths of at least two partial strings of the effective string set are different from each other.

5. The method of claim 1, wherein the partial strings of the effective string set are those partial strings that are not included in other partial strings of the plurality of partial strings.

6. The method of claim 1, wherein the generating of the effective string set comprises:
separating the query string into n-grams having a variety of lengths;
selecting n-grams included in index terms of the database from among the n-grams; and
determining a set of n-grams that are not included in other n-grams, from among the selected n-grams, as the effective string set.

7. The method of claim 1, wherein the database comprises:
an inverted index database comprising an index tree and posting lists; and
a document database in which a plurality of documents having identification information are stored.

8. The method of claim 7, wherein the searching for the document comprises:
searching for identification information of documents that match all partial strings of the candidate set in the inverted index database; and
searching for documents that have the identification information of the documents in the document database.

9. An apparatus for processing a query, the apparatus comprising:
a user interface configured to receive a query string and to output a document comprising the query string;
a database in which information about a plurality of documents is stored; and
a processor configured to:
generate, from the received query string, an effective string set comprising a plurality of partial strings which have a variety of lengths,
generate a plurality of subsets of the effective string set, each respective subset comprising one or more of the partial strings,
determine a reference number of partial strings,
determine, based on access costs of the plurality of subsets for a database in which information about a plurality of documents is stored, a candidate set comprising a subset from the plurality of subsets that has an access cost that is less than a reference value, and
search for a document comprising the received query string from the information stored in the database using the candidate set,
wherein, when a number of the partial strings in the effective string set is less than the reference number of partial strings, the processor is configured to determine the candidate set by
arranging the plurality of subsets in a tree structure,
selecting a subset from among the plurality of subsets using a depth first search in the tree structure, calculating, for each of the partial strings in the selected subset, a portion of the access cost that comprises a cost used to access and read a posting list of the partial strings, when the portion of the access cost is less than the reference value, calculating the access cost of the selected subset, when the access cost of the selected subset is less than or equal to the reference value, predicting the selected subset as a predicted candidate set, and when there are no additional subsets among the plurality of subsets to be selected using the depth first search, determining the candidate set to comprise the predicted candidate set, and wherein when the number of the partial strings in the effective string set is greater than the reference number of partial strings, the processor is configured to determine the candidate set by selecting first subsets that have a same number of partial strings from among the plurality of subsets, calculating the access costs for each of the first subsets, predicting a subset among the first subsets that has a minimum access cost as the predicted candidate set;

selecting second subsets, in which a partial string is added to the predicted candidate set, from among the plurality of subsets, and when the access costs for each of the second subsets are greater than the access cost of the predicted candidate set, determining the candidate set to comprise the predicted candidate set.

10. The apparatus of claim 9, wherein the access cost of the selected subset comprises the portion of the access cost and a cost used to access and read document identification information commonly included in the posting lists of the partial strings included in the selected subset in the database.

11. The apparatus of claim 9, wherein lengths of at least two partial strings from among partial strings of the effective string set are different from each other.

12. The apparatus of claim 9, wherein the partial strings of the effective string set those partial strings that are not included in other partial strings of the plurality of partial strings.

13. The apparatus of claim 9, wherein the database comprises:

an inverted index database comprising an index tree and posting lists; and a document database in which a plurality of documents having identification information are stored.

14. The apparatus of claim 13, wherein the processor is configured to search for identification information of documents that match all partial strings of the candidate set in the inverted index database and search for documents that have the identification information of the documents in the document database.

* * * * *